United States Patent [19]

Schofield

[11] 4,349,389
[45] Sep. 14, 1982

[54] DISPERSIBLE INORGANIC PIGMENT
[75] Inventor: John D. Schofield, Bury, England
[73] Assignee: Imperial Chemical Industries Limited, London, England
[21] Appl. No.: 220,717
[22] Filed: Dec. 29, 1980
[30] Foreign Application Priority Data
  Jul. 26, 1979 [GB] United Kingdom ............. 7926102
  Feb. 14, 1980 [GB] United Kingdom ............. 8005066
[51] Int. Cl.$^3$ ..................... C04B 31/44; C09C 1/28
[52] U.S. Cl. ........................... 106/308 Q; 106/308 M
[58] Field of Search ................... 106/308 Q, 308 M
[56] References Cited
U.S. PATENT DOCUMENTS 3,409,585 11/1968 Hagemeyer, Jr. et al. .... 106/308 M
  3,773,539 11/1973 Burgyan et al. ............. 106/308 Q
  3,819,566  6/1974 Pinsky et al. ............... 106/308 M
  3,956,230  5/1976 Gaylord ..................... 106/308 Q
  4,038,244  7/1977 Ogden ....................... 260/42.16
  4,068,024  1/1978 Laufer ....................... 106/308 Q
  4,091,164  5/1978 Schwarz ..................... 106/308 M
  4,127,421 11/1978 Ferrill, Jr. ................. 106/308 M

FOREIGN PATENT DOCUMENTS 1538718 1/1979 United Kingdom .

Primary Examiner—Carl F. Dees
Attorney, Agent, or Firm—Cushman, Darby & Cushman

[57] ABSTRACT

A dispersible inorganic pigment composition in which the surface of a finely divided inorganic pigment is coated with a substance which renders the surface hydrophobic and then with a thermoplastic polymer and a process for the preparation of the composition. The composition is readily dispersible in thermoplastics and paints and it can be used to color thermoplastic materials directly, avoiding the preparation of a master batch.

7 Claims, No Drawings

DISPERSIBLE INORGANIC PIGMENT

This invention relates to a dispersible inorganic pigment composition, suitable for use in the colouration of thermoplastic materials and paints, and to a process for the preparation of such a dispersible inorganic pigment composition.

According to the present invention there is provided a dispersible inorganic pigment composition comprising a finely divided inorganic pigment, the particles of which carry a first layer of a substance which renders the pigment surface hydrophobic, hereinafter referred to as the hydrophobing agent, and a second layer of a thermoplastic polymer, hereinafter referred to as the polymer.

An important use for the present pigment composition is in the colouration of thermoplastic materials. The term "thermoplastic material" includes high molecular weight polymeric materials such as may be heat formed into fibres, films, sheets and a variety of shaped articles. It also includes lower molecular weight polymeric materials such as are used for the preparation of masterbatches and as additives to and modifiers of the aforementioned high molecular weight materials and which are also used to form the second layer of the present pigment composition. As examples of such thermoplastic materials there may be mentioned polyolefins such as polyethylene, polypropylene and polystyrene, vinyl polymers such as polyvinyl chloride and acetate, acrylic polymers such as polyacrylates, polymethacrylates and polyacrylonitrile, polyesters such as polyethylene terephthalate and polyamides such as polyhexamethylene adipamide and co-polymers based on these and other conventional monomers. The pigment composition may also be used for the colouration of solvent, i.e. non-aqueous, paints in which it may be dispersed in a similar manner to conventional pigments.

The inorganic pigment may be selected from any of the known classes of inorganic pigments such as, for example, lead chromes, zinc chromes, cadmium sulphide; metal oxides, such as iron oxides, lead oxides, zinc oxides and titanium dioxide, metal ferri- and ferrocyanides, ultramarine and vermilion. As specific examples of lead chrome pigments there may be mentioned lemon or primrose chrome pigments, comprising mixed crystals of lead sulphate and lead chromate, middle yellow or orange chromes, comprising lead chromate or basic lead chromate and scarlet chromes, comprising mixed crystals of lead sulphate, chromate and molybdate.

The pigment, particularly in the case of the lead chromes and titanium dioxide may also carry one or more superficial coatings, such as are commonly applied to such pigments selected from, for example, silica, alumina, titania (on chrome pigments), phosphate and antimony, before the application of the above defined first and second layers.

The polymer which forms the second layer of the pigment composition may be selected from thermoplastic polymers and co-polymers such as those derived from olefines and diolefines, for example, ethylene, propylene, styrene, butadiene and isoprene; acrylates, for example, acrylic and methacrylic acids and their esters and acrylonitrile; and vinyl and vinylidene compounds, for example, vinyl chloride, alcohol and acetate; polyesters such as polyethylene terephthalate; polyamides such as polyhexamethylene adipamide and natural waxes. The polymer, preferably has a softening point around or below 100° C. so that it can be applied to the pigment from an aqueous emulsion dispersion or solution in a sufficiently fluid condition to evenly cover and adhere to the hydrophobic surface of the pigment after application of the first layer. In this specification the term "polymer includes the pure polymer or co-polymer and a mixture of the polymer or copolymer with up to 30% by weight of an emulsifying agent, such as a fatty acid or amine, e.g. oleic acid which will serve to depress the softening point to 100° C. or below. Especially preferred polymers are polyolefines, particularly those having a weight-average molecular weight below 20,000. Although the polymer should be compatible with medium i.e. the thermoplastic material or the binder of the paint, into which it will be dispersed it need not be chemically similar to this medium although it is convenient for it to be so.

It is believed that the polymer acts as a lubricant during dispersion of the pigment composition particularly into thermoplastic materials, and also protects the first layer prior to dispersion of the pigment composition. Although the polymer should be compatible with the medium, i.e. the thermoplastic material or paint, into which it will be dispersed it need not be chemically similar to the thermoplastic material or the paint binder although in the case of high molecular weight thermoplastic materials it is convenient for the polymer to be a low molecular weight version of the same chemical species.

The hydrophobing agent is preferably an amphiphile i.e. it preferably comprises one or more hydrophobic chains which is compatible with the chains of the polymer which forms the second layer and one or more hydrophilic groups which is attracted to the pigment and serves to anchor the hydrophobing agent to the surface of the pigment. The hydrophobic chain preferably comprises a chain of carbon atoms which may be interrupted by O, N or S atoms and more preferably contains from 12 to 250 carbon atoms and more preferably from 25 to 100. The hydrophilic anchor group may be electrophilic or nucleophilic depending on the nature of the pigment surface to which it must adhere. As examples of suitable hydrophilic groups there may be mentioned amino groups, quaternary ammonium groups, carboxylic acid groups, amido groups, urethane groups, phosphate, sulphonate and sulphate.

With the more strongly hydrophilic groups, such as for example amido, carboxylic acid and quaternary ammonium, the presence of a single group in the hydrophobing agent is generally sufficient to anchor the hydrophobic chain or chains to the pigment surface. With the less strongly hydrophilic groups, such as for example urethane groups, it is desirable to have 2 or more such groups in close proximity in order to provide sufficient attraction between the pigment surface and the hydrophobing agent to anchor the hydrophobic chain or chains to the pigment surface.

However many inorganic pigments are amphoteric and are therefore capable of attracting and adhering to both electrophilic and nucleophilic species.

As specific examples of suitable hydrophobing agents there are mentioned long chain (i.e. $C_{12}$ to $C_{50}$) alkyl and alkylbenzene sulphonic acids such as Dobanic Acid (4-dodecyl benzene sulphonic acid), and fatty i.e. long chain ($C_{17}$ to $C_{50}$) amines or diamines and their salts or quaternary derivatives such as dioctadecyl dimethylammonium chloride (available as Arquad 2HT, RTM).

As the role of the hydrophobing agent is to make the pigment surface compatible with the relatively non-polar polymer, many dispersing agents previously shown to disperse pigments in organic solvents show particular suitability when applied as hydrophobing agents in the present invention; specific examples being those described in the following UK patent Nos. 1235283, 1313745, 1346298, 1393401, 1393402, 1424517 and 1445135.

Within this group of dispersing agents, especially preferred as a hydrophobing agent, is a polyester, or a salt or amide thereof, derived from a hydrocarboxylic acid of the formula $HO-X-CO_2H$ wherein X is a divalent saturated or unsaturated aliphatic radical containing at least 8 carbon atoms and in which there are at least 4 carbon atoms between the hydroxy and carboxylic groups, or from a mixture of such a hydroxy carboxylic acid and a carboxylic acid which is free from hydroxy groups. Examples of such hydrophobing agents are the dispersing agents described in the following UK Pat. Nos. 1342746, 1343606, 1373660 and 2001083A and particularly those in which the molecular weight of the polyester chain is in the range 500 to 5500. Alternatively the hydrophobic chain may be a poly (lower alkylene oxy) chain, preferably one in which at least 50% of the alkylene groups contain 3 or more carbon atoms, or a poly (carbonyl lower alkylene oxy) chain. Examples of such hydrophobing agents are the dispersing agents described in the German OLS No. 2807362.

The dispersible pigment composition preferably contains from 40% to 95% of the pigment, from 2.5% to 25% of the hydrophobing agent and from 5% to 45% of the polymer, and more preferably from 70% to 90% of the pigment, from 2.5% to 15% of the hydrophobing agent and from 5% to 25% of the polymer, all percentages being by weight based on the total weight of the composition.

According to a further feature of the present invention there is provided a process for the preparation of a dispersible inorganic pigment composition which comprises the treatment of a slurry of a finely divided inorganic pigment in an inert liquid with a substance which renders the pigment surface hydrophobic, the hydrophobing agent, followed by treatment with a thermoplastic polymer at a temperature of or above the softening point of the polymer.

The process is preferably performed in an aqueous medium in which case it is preferred to use a polymer with a softening point below 100° C. If the softening point of the pure polymer is above 100° C. this may be effectively lowered by mixing the polymer with an emulsifying agent as hereinbefore described and in relation to this process the term "polymer" includes a mixture of the polymer with an emulsifying agent or the like which serves to lower its softening point.

The process may be performed at the end of the pigment preparation process, or after some previous surface treatment process, in the aqueous medium used for such processes which may contain dissolved salts etc. Alternatively the pigment may be filtered and washed and reslurried in water for the present process. Before the pigment is treated according to the present process it is preferably in the form of particles comprising primary crystals or loose aggregates thereof and the mean diameter of the primary particles is preferably below 20 microns and more preferably below 5 microns.

The hydrophobing agent and the polymer may be added to the pigment slurry either alone or in the form of solutions, emulsions or dispersions, preferably in aqueous media. Alternatively either or both compounds may be added in an emulsifiable or dispersible form after mixture with a dispersing or emulsifying agent suitable for dispersing or emulsifying the compound into an aqueous medium.

The hydrophobing agent and the polymer may be added to the pigment slurry together or sequentially at ambient or at an elevated temperature. It is however preferred that the temperature of the pigment slurry is sufficient to soften the polymer before the polymer is added to the slurry.

If the pigment is treated in an aqueous medium it may be subsequently isolated by filtration, washed free of soluble matter with water and dried in any conventional manner, e.g. in a stove or a spray drier.

If the process does not already require heating above 80° C., it can be beneficial to subject the treated pigment to a heat treatment above 80° C. before it is isolated from the aqueous medium in order to improve the adhesion of the polymer. If the pigment composition is dried for an extensive period at an elevated temperature it is preferred that this temperature is well below 100° C. and more especially in the region of 50°–60° C. to avoid the damage to the superficial layers.

Lead chrome pigments treated according to the present invention generally have improved heat stability compared with the equivalent pigments which have not been so treated.

Many of the inorganic pigments treated according to the present process are much less dusty than the equivalent untreated pigments.

The present pigment composition is easily-dispersible in that it can be readily dispersed into a thermoplastic material without the application of high shear forces to produce even and highly intensive coloration of the substrate. A simple, dry mixing, e.g. tumbling, of the pigment composition with the thermoplastic material in the form of chips, granules, beads, powder, etc. followed by a heat shaping operation, such as extrusion or injection moulding, is, in many cases, sufficient to produce an evenly coloured material which is comparable in quality to that produced by the well-known but more complex master-batch technique. A thermoplastic material coloured with a pigment composition as hereinbefore defined and a process for its preparation by a high or a low shear mixing technique are further features of the present invention.

Many of the present pigment compositions produce a coloured thermoplastic material that is substantially free from specks of undispersed pigment under these circumstances. These pigment compositions also frequently exhibit increased colour development as compared with the untreated pigment when a low shear colouring technique such as is described above is used.

The composition of the present invention shows advantage over the master batch and other chipped materials in the ease and simplicity of preparation and over other conventional pigment formulations in its ease of dispersibility and good physical form which renders it substantially free from dust.

The invention is illustrated by the following examples in which all parts and percentages are by weight.

(1) Preparation of Hydrophobing Agents and Polymer emulsions Preparation of Agent A and conversion into aqueous emulsions Agent A is polyhydroxystearic acid of acid value 35 mg KOH/g.

Emulsion A1 is prepared by thoroughly mixing 250 parts of Agent A and 68 parts dodecylbenzene sulphonic acid (Shell-"Dobanic acid JN"), and then slowly blending in 682 parts of water. Emulsification is completed with the aid of a "Silverson" (RTM) mixer.

Emulsion A2 is prepared by mixing 250 parts of Agent A and 725 parts of water using a Silverson mixer, while slowly adding 25 parts of triethanolamine.

Preparation of Agent B and conversion into an aqueous emulsion

A mixture of 320 parts of Agent A (described above), 10.2 parts dimethylaminopropylamine and 65 parts of toluene is stirred under reflux using a Dean and Stark head to remove water. The temperature is raised to 165° C. and held there for 6 hours. After cooling to room temperature under nitrogen an 87.6% solution of the adduct is obtained.

226 parts of this adduct are stirred at 40° C. and 6.7 parts of dimethyl sulphate are added. An exotherm raises the temperature to 50° C. which is further raised to 90° by external heating. After holding at 90° C. for 90 minutes it is cooled to room temperature. No free dimethyl sulphate is detectable in the product by gas/liquid chromatography. This is Agent B.

Emulsion B is prepared by warming a mixture of 180 parts of Agent B and 45 parts of Duomeen O (a fatty diamine marketed by the Armour Hess Division of AKZO) to 40° C. and slowly blending in a solution of 9 parts of glacial acetic acid in 702 parts of water.

Preparation of Agent C and conversion into aqueous emulsions

A mixture of 320 parts of Agent A (previously described) 10.2 parts of dimethylaminopropylamine and 65 parts of toluene is stirred under reflux using a Dean and Stark head to remove water. The temperature is raised to 165° C. and held there for 6 hours. The remaining toluene is then removed by vacuum distillation. This is Agent C.

Emulsion C1 is prepared by mixing 50 parts of Agent C with 200 parts of water using a Silverson mixer, while slowly adding 16 parts of glacial acetic acid.

Emulsion C2 is prepared by mixing 46 parts of Agent C and 2.3 parts of Duomeen O (see above) with 200 parts of water using a Silverson mixer, while slowly adding 2.3 parts of glacial acetic acid.

Preparation of Agent D and conversion into an aqueous emulsion 750 parts of Agent A (previously described) and 1000 parts of SBP 3 (a hydrocarbon solvent, boiling range 100°-120°, supplied by Shell Chemicals) are stirred and 500 parts of approximately 50% aqueous solution of polyethylene imine having a molecular weight in the region of 50,000 (Polymin P, supplied by BASF) is added. This mixture is then heated under reflux for 8 hours to remove all water. A viscous but transparent solution is obtained. The solvent is then carefully removed under vacuum at 120° C. to give Agent D, a rubbery solid.

Emulsion D is produced by first mixing 200 parts of Agent D with 800 parts of water using a Silverson mixer fitted with a disintegration head; and then passing the crude dispersion obtained through a Manton-Gaulen pressure homogeniser. After several passes a stable emulsion is formed without the aid of further additives.

Preparation of Agent E and conversion into an aqueous emulsion

A mixture of 111 parts of ε-caprolactone, 8.1 parts of 3-dimethylaminopropylamine and 0.1 parts of tetrabutyl titanate is stirred for 1½ hours at 160°-165° C. under nitrogen. On cooling it forms a hard wax of equivalent 1552. This is Agent E.

60 parts of Agent E and 25 parts Duomeen O (see above) are mixed together at 80° C. and added to 6 parts glacial acetic acid in 234 parts of water, also at 80° C., while stirring very vigorously using a Silverson mixer. The preparation is then cooled while still mixing with the Silverson mixer. The total solids is adjusted to 17% by addition of further water. This is Emulsion E.

Preparation of Agent F and conversion into an aqueous emulsion

The solution of a dispersing agent described in in Example 1 of British Pat. No. 1393402 is prepared, and solvent is then removed by distillation under vacuum. This is Agent F.

60 parts of Agent F, 15 parts oleic acid and 10 parts of morpholine are mixed together at 80°, and whilst still hot, run into 210 parts of water at 80° C. using a Silverson mixer to stir the preparation. After cooling, water is added to adjust the total solids of the preparation to 25%. This is Emulsion F.

Preparation of Agent G and conversion into an aqueous emulsion

Agent G is an adduct prepared from one molecular proportion of 2-diethylaminoethanol, 10 molecular proportions of ethylene oxide and then 20 molecular proportions of propylene oxide.

Emulsion G is prepared by stirring together 75 parts of Agent G and 225 parts of water with a Silverson mixer.

Polymeric Emulsion H

This is Mykon SF 40, a non-ionic polyethylene emulsion, 33% solids, supplied by Warwick Chemicals.

Polymeric Emulsion J 40 parts of polyethylene wax (Allied Chemicals AC 629), 7 parts of oleic acid and 7 parts of morpholine are melted together at 120° C., and then added with stirring to 150 parts of water at 95°-97° C. The emulsion so prepared is adjusted to 25% solids by addition of water as necessary to take account of evaporation during processing.

Polymeric Emulsion K

This is a carboxylated medium-high acrylonitrilebutadiene copolymer latex based on a synthetic anionic soap system, total solids 48%, supplied by BP Chemicals Limited under the trade name Breon 9370.

Polymeric Emulsion L

This is a vinyl chloride polymer latex of mean particle size 0.4 μm, stabilised with an anionic surfactant, and having 38% total solids.

Polymeric Emulsion M

This is a vinylidene chloride polymer latex, stabilised with an anionic surfactant, total solids 46%, and sold by Imperial Chemical Industries Limited, Plastics Division under the trade description VICLAN VL 895.

Polymeric Emulsion N

This is prepared in the same manner as Polymeric Emulsion J except that the 7 parts of morpholine are replaced by 7.2 parts of dimethylaminoethanol.

(2) Preparation of Pigment Compositions

Examples 1 to 7 are dispersible compositions of a lemon chrome pigment.

EXAMPLE 1

A 10% aqueous slurry of a lemon chrome pigment coated with a metaphosphate salt, and containing 75 parts dry pigment plus residual salts from the pigment preparation (e.g. $NaNO_3$), is stirred at 65°–70° C. 20 Parts of Emulsion A2 (previously described) are added to the slurry, followed by 80 parts of Polymeric Emulsion J (previously described). The temperature is increased to 90°, then cooled to 50° in order to coagulate the coated pigment particles. After filtration and washing, the solid thus obtained is dried at 50°, and the dry lumps broken up and passed through an #18 mesh sieve. The powder so obtained can be used without further grinding or milling.

Example 2

This is prepared as Example 1, but using 75 parts pigment, 26.3 parts of Emulsion B and 80 parts of Polymeric Emulsion J.

Example 3

This is prepared as Example 1, but using 75 parts pigment, 20 parts of Emulsion F and 80 parts of Polymeric Emulsion J.

Example 4

This is prepared as Example 1, but using 75 parts pigment, 20 parts of Emulsion G and 80 parts of Polymeric Emulsion J.

Examples 5–7

These are prepared as Example 1 using 75 parts pigment, 20 parts of Emulsion A2 and 52.6 parts of Polymeric Emulsion L (Example 5), 43.4 parts of Polymeric Emulsion M (Example 6) or 41.7 parts of Emulsion K (Example 7).

Examples 8–13 are dispersible compositions of a middle chrome pigment.

Example 8

A 10% slurry of a middle chrome pigment coated with metal oxides, and containing 75 parts dry pigment plus residual salts from the pigment preparation (e.g. $NaNO_3$) is stirred at 55°–60° C. 26.3 parts of Emulsion B are added to the slurry, followed by 80 parts of Polymeric Emulsion J. The preparation is then continued as in Example 1. The degree of coagulation obtained on heating and then cooling is however somewhat greater, and gives a product that is slightly easier to sieve.

Example 9

This is prepared as in Example 8, but using 75 parts pigment, 39 parts of Emulsion E and 80 parts of Polymeric Emulsion J.

Example 10

This is prepared as in Example 8, but using 70 parts pigment, 20 parts of Emulsion A2 and 100 parts of Polymeric Emulsion J.

Example 11

This is prepared as in Example 8, but using 75 parts pigment, and adding 5 parts Agent E dissolved in 20 parts acetone followed by 80 parts of Polymeric Emulsion J.

Example 12

This is prepared as in Example 8, but using 75 parts pigment, and adding 5 parts dioctadecyl dimethyl ammonium chloride (available as Arquad 2HT, RTM) previously dispersed in 95 parts water, followed by 80 parts of Polymeric Emulsion J.

Example 13

Sufficient water is added to a washed press paste of a middle chrome pigment coated with mixed metal oxides (80 parts dry pigment) to enable it to be fluidised with a Silverson mixer. 40 parts of Emulsion A1, followed by 30 parts of polymeric emulsion H are then added while stirring with the Silverson mixer. This aqueous dispersion is then spray-dried in a Niro Minor drier, inlet temperature 135° C., outlet temperature 80° C. The powder so obtained can be used without further grinding or milling.

Examples 14–16 are dispersible compositions of a titanium dioxide pigment.

Example 14

75 Parts of titanium dioxide (Tioxide Ltd., grade R-CR2) is suspended in 1084.6 parts of water, and the temperature is raised to 65°–70°. 26.3 parts of Emulsion B are added to the suspension, followed by 80 parts of Polymeric Emulsion J. The temperature is increased to 90° C. then cooled to 50° C. in order to coagulate the coated pigment particles. Isolation of the product is as described in Example 1.

Example 15

This is prepared as Example 14, but using 75 parts pigment, 25 parts of Emulsion D and 80 parts of Polymeric Emulsion J.

Example 16

This is prepared as Example 14, but using 75 parts pigment, 39.4 parts of Emulsion E and 80 parts of Polymeric Emulsion J.

Example 17

75 parts Cadmium Yellow (ex Reckitts Ltd., Colour Index Pigment Yellow 37) is suspended in 1090.9 parts of water and the temperature is raised to 65°–70° C. 20 parts of Emulsion A2 are added to the suspension, followed by 80 parts of Polymeric Emulsion J. The temperature is increased to 90° C., then cooled to 50° C. in order to coagulate the coated pigment particles. Isolation of the product is as described in Example 1.

Example 18

A 9.6% aqueous slurry of a scarlet chrome pigment (comprising mixed crystals of lead sulphate, chromate and molybdate) coated with mixed metal oxides, and containing 75 parts dry pigment plus residual salts from the pigment preparation (e.g. $NaNO_3$) is stirred at 65°–70° C. 20 parts of Emulsion A2 are added to the slurry, followed by 80 parts of Polymeric Emulsion J. The temperature is increased to 90° C., then cooled to 50° C. in order to coagulate the coated pigment particles. Isolation of the product is as described in Example 1.

Example 19

75 parts of Ultramarine (ex Reckitts Ltd., grade A120, Colour Index Pigment Blue 29) is suspended in 1066 parts of water, and the temperature raised to 65°–70° C. 26 parts of Emulsion B are added to the slurry followed by 80 parts of Polymeric Emulsion J. The temperature is increased to 90°, then cooled to 50° C. in order to coagulate the coated pigment particles. Isolation of the product is as described in Example 1.

Example 20

This is prepared as Example 19, but using 75 parts pigment, 26.6 parts of Emulsion C1 and 80 parts of Polymeric Emulsion J.

Example 21

75 Parts iron oxide (ex Bayer, grade 920, Colour Index Pigment Yellow 42) is suspended in 1100 parts of water, and the temperature raised to 65°–70° C. 26 parts of Emulsion B are added to the slurry followed by 80 parts of Polymeric Emulsion J. The temperature is increased to 90° C., then cooled to 50° C. in order to coagulate the coated pigment particles. Isolation of the product is as described in Example 1.

Example 22

This is prepared as Example 19, but using 75 parts Prussian Blue pigment (ex Manox, grade 407, Colour Index Pigment Blue 27), 26 parts of Emulsion B and 80 parts of Polymeric Emulsion J.

Example 23

This is prepared as Example 1 except that the amount of pigment is reduced to 50 parts, the 20 parts of Emulsion A2 are replaced by 25 parts of Emulsion C2 and the 80 parts of Polymeric Emulsion J are replaced by 180 parts of Polymeric Emulsion N.

Example 24

This is prepared as Example 23 except that the amount of pigment is increased to 90 parts, the amount of Emulsion C2 is reduced to 12.5 parts and the amount of Polymeric Emulsion N is reduced to 30 parts.

(3) Preparation and Assessment of Coloured Thermoplastic Materials

Because the treated pigments described above show particularly improved dispersibility under low shear conditions, colouration has been carried out under such conditions.

Examples 25 to 48

A weight of the pigment composition containing 1 part of the basic pigment (i.e. in the case of Example 1, 1.33 parts of the pigment composition) is tumbled for 15 minutes with 100 parts low density polyethylene granules (ex ICI Plastics Division, Alkathene Grade WNG 14). The mixture is then extruded directly on a Betol single screw extruder, at a L/D ratio of 30:1 through a "coathanger" die giving a film of width 100 millimeters and thickness 0.4 millimeters.

A visual assessment is made of the degree of speckiness of the film, caused by undispersed pigment particles. The assessment is recorded on a 1–5 scale, 5 meaning virtually speck free, and 1 meaning very specky indeed.

The degree of colour development for each film is assessed visually and by measuring the contrast ratio of the film over black and white backgrounds using a Colour Difference Meter manufactured by Instrumental Colour Systems Ltd., of Newbury, Berkshire. The contrast ratio is quoted as a percentage with an increase in the ratio indicating an increase in opacity and thus an increase in colour development. There is generally good agreement between visual and instrumental assessments of colour development.

Table I records the assessment of polyethylene films prepared as described above using the pigment compositions described in Examples 1 to 24. Also recorded are the results obtained by incorporation of the untreated pigments, used to prepare the pigment compositions of Examples 1 to 24, in the same film. Comparison between treated and untreated pigments indicates the improvements obtained by the application of this invention.

TABLE I

| Ex. | Sample | Contrast Ratio % | Speckiness 1–5 scale |
|---|---|---|---|
|  | Untreated Lemon Chrome pigment with metaphosphate coating | 40.0 | 2 |
| 25 | Example 1 | 56.4 | 4–5 |
| 26 | Example 2 | 56.7 | 5 |
| 27 | Example 3 | 53.5 | 4 |
| 28 | Example 4 | 64.6 | 3 |
| 29 | Example 5 | 42.9 | 2 |
| 30 | Example 6 | 42.9 | 2 |
| 31 | Example 7 | 43.9 | 2 |
| 32 | Example 23 | 56.9 | 5 |
| 33 | Example 24 | 54.8 | 3 |
|  | Untreated Middle Chrome pigment with mixed metal oxide coating | 47.5 | 2 |
| 34 | Example 8 | 59.8 | 5 |
| 35 | Example 9 | 65.8 | 5 |
| 36 | Example 10 | 61.0 | 4 |
| 37 | Example 11 | 54.3 | 3–4 |
| 38 | Example 12 | 64.0 | 5 |
| 39 | Example 13 | 66.3 | 4 |
|  | Titanium Dioxide (Grade RCR-2 ex Tioxide Ltd.) | 65.4 | 2 |
| 40 | Example 14 | 79.7 | 4–5 |
| 41 | Example 15 | 65.2 | 4 |
| 42 | Example 16 | 84.3 | 5 |
|  | Cadmium Yellow (ex Reckitts Ltd.) | 72.7 | 2 |
| 43 | Example 17 | 77.0 | 4–5 |
|  | Untreated molybdated Chrome pigment with mixed metal oxide coating | 58.1 | 2 |
| 44 | Example 18 | 72.8 | 5 |
|  | Ultramarine (ex Reckitts Ltd., grade A120) | 6.8 | 2 |
| 45 | Example 19 | 9.8 | 2 |
| 46 | Example 20 | 8.0 | 3 |
|  | Iron Oxide (ex Bayer, grade 920) | 59.3 | 2 |

TABLE I-continued

| Ex. | Sample | Contrast Ratio % | Speckiness 1-5 scale |
|---|---|---|---|
| 47 | Example 21 | 72.6 | 3 |
|  | Prussian Blue (ex Manox Ltd., grade 407) | 12.3 | 2 |
| 48 | Example 22 | 39.3 | 3 |

Examples 49 to 51

A weight of the pigment composition containing 1 part of the basic pigment is tumbled for 15 minutes with 100 parts of plasticised polyvinyl chloride granules (ex ICI Plastics Division, "Welvic", crystal grade X4/873). The mixture is extruded through an unrestricted die to give a film 100 mm wide and 0.6 mm thick. The assessments of contrast ratio and speckiness on the same basis as in Examples 23 to 44 are recorded in Table II.

TABLE II

| Example | Pigment/Pigment Composition | Contrast Ratio % | Speckiness 1-5 scale |
|---|---|---|---|
|  | Lemon Chrome Pigment used in Examples 1 to 7 | 73.8 | 3-4 |
| 49 | Pigment Composition of Example 5 | 81.7 | 3-4 |
| 50 | Pigment Composition of Example 6 | 85.4 | 4 |
| 51 | Pigment Composition of Example 7 | 78.6 | 3-4 |

Example 52

A polyethylene film is prepared according to the method of Example 36 except that in place of the quantity of the pigment composition required to give 1 part of pigment there is used the quantity required to give 4% pigment in the film.

This film is compared with a film of the same polyethylene containing 4% pigment which is prepared by blending 20 parts of the master batch described below with 80 parts of polyethylene and extrusion according to the method of Examples 23 to 44. The master batch is prepared according to normal practice by blending 20 parts of the middle chrome pigment used in Example 10 with 80 parts of polyethylene in a high-shear internal mixer ("Banbury" mixer), extruding the mixture through a die and cutting the extrudate into chips.

The films are compared for the same properties as in Examples 25 to 51 and the results set out in Table III.

TABLE III

| Film | Contrast Ratio % | Speckiness 1-5 Scale |
|---|---|---|
| Example 52 | 96.2 | 5 |
| From Master batch | 95.9 | 5 |

These results demonstrate that a pigment composition according to the present invention disperses as readily as a conventional master batch in a thermoplastic material and that the coloured thermoplastic material derived from the pigment composition is equal in quality to that derived from the master batch.

It is, of course, possible to use the pigment composition of the present invention to prepare a master batch containing a high concentration of pigment by dispersing the composition in a thermoplastic material by the process described in Examples 25 to 51 but using a much higher ratio of pigment to thermoplastic material and to use this master batch to colour a bulk of the thermoplastic material in a conventional manner.

We claim:

1. A dispersible pigment composition comprising a finely divided inorganic pigment the particles of which carry a first layer of a hydrophobing agent consisting of a hydrophobic chain containing from 12 to 250 carbon atoms attached to a hydrophilic group which anchors the hydrophobic chain to the pigment surface, and a second layer of a thermoplastic polymer or a mixture thereof with an emulsifying agent, having a softening point at or below 100° C., the second layer evenly covering and adhering to the hydrophobic first layer.

2. A dispersible pigment composition according to claim 1 wherein the polymer has a weight average molecular weight below 20,000.

3. A dispersible pigment composition according to claim 1 wherein the carbon atoms of the hydrophobic chain are interrupted by oxygen, nitrogen or sulphur atoms.

4. A pigment composition according to claim 1 containing from 40% to 95% of the pigment, from 2.5% to 25% of the hydrophobing agent and from 5% to 40% of the polymer all by weight based on the total weight of the composition.

5. A process for preparing a dispersible inorganic pigment composition which comprises
   (a) treating a slurry of a finely divided inorganic pigment in an inert liquid with a hydrophobing agent consisting of a hydrophobic chain containing from 12 to 250 carbon atoms attached to a hydrophilic group, capable of anchoring the hydrophobic chain to render the surface of the pigment hydrophobic followed by
   (b) treating the hydrophobic pigment with a thermoplastic polymer, or a mixture thereof with an emulsifying agent having a softening point at or below 100° C., at the temperature of or above said softening point.

6. A process according to claim 5 wherein the hydrophobing agent and the polymer are added as solutions, emulsions or dispersions in an inert liquid.

7. A process according to claim 5 in which the inert liquid is an aqueous medium.

* * * * *